United States Patent
Richard

[19]

[11] Patent Number: 6,073,565
[45] Date of Patent: Jun. 13, 2000

[54] DISK OPENER AND PACKER WHEEL SYSTEM

[76] Inventor: Leroy Richard, 734--13th Ave. East, West Fargo, N. Dak. 58078

[21] Appl. No.: 09/169,458

[22] Filed: Oct. 9, 1998

[51] Int. Cl.[7] ...................................................... A01C 5/00
[52] U.S. Cl. ............................ 111/167; 111/164; 172/583
[58] Field of Search .................................... 111/200, 190, 111/191, 182, 183, 193, 194, 195, 196, 197, 166, 167, 134, 136; 172/538, 701, 583, 574, 575, 394, 602, 604, 617

[56] References Cited

U.S. PATENT DOCUMENTS

| | | | |
|---|---|---|---|
| 3,841,245 | 10/1974 | Tye | 111/85 |
| 3,841,529 | 10/1974 | Hatcher | 222/177 |
| 4,422,511 | 12/1983 | Poggemiller et al. | 172/572 X |
| 5,609,114 | 3/1997 | Barton | 111/167 |

*Primary Examiner*—Robert Pezzuto
*Attorney, Agent, or Firm*—Michael S. Neustel

[57] ABSTRACT

A disk opener and packer wheel system for maintaining a constant disk opener depth and for maintaining a constant packing of the soil by the packer wheel when planting upon uneven surfaces. The inventive device includes a frame having a bracket for attaching to the drill, a pair of support arms pivotally attached to the frame, a compression spring positioned between the support arm and the frame, a first member pivotally attached between the pair of support arms, a second member pivotally attached between the pair of support arms, a disk opener attached to the lower end of the first member, a packer wheel attached to the lower end of the second member, and an adjusting shaft adjustably positioned between the upper ends of the first member and the second member. In use, when the disk opener engages a hard object, such as a rock, the disk opener and the support arm are elevated while the packer wheel is forced downwardly to compensate for the elevated support arm. When the packer wheel engages a hard object, such as a rock, the packer wheel and the support arm are elevated while the disk opener is forced downwardly to compensate for the elevated support arm. The user may adjust the relative heights of the disk opener and the packer wheel by simply manipulating the adjusting shaft.

15 Claims, 2 Drawing Sheets

DISK OPENER AND PACKER WHEEL SYSTEM

BACKGROUND OF THE INVENTION

1. Field of the Invention

The present invention relates generally to drills and more specifically it relates to a disk opener and packer wheel system for maintaining a constant disk opener depth and for maintaining a constant packing of the soil by the packer wheel when planting upon uneven surfaces.

Combination disk openers and packer wheels have been in use for years. Conventional devices work excellent when utilized upon relatively smooth ground surfaces. However, uneven seeding can occur when seeding upon relatively rough ground surfaces. Since it is extremely important to have a constant seed depth with the soil, conventional seeding systems do not provide the best possible crop. Hence there is a need for a seeding system that operates on both smooth and rough ground surfaces.

2. Description of the Prior Art

Drill furrow openers and packer wheels have been in use for years. Typically, a conventional seed drill will have a frame member pivotally attached to the implement frame with a spring means maintaining downward pressure upon the frame member. Attached to the front portion of the frame member is the disk opener with a seed tube positioned within and behind the disk opener. Attached to the rear portion of the frame member is the packer wheel for packing the opened furrow created by the disk opener.

When using a conventional seed drill, typically a disk opener will penetrate the ground surface at a desired depth to create a furrow. The seed is placed within the opened furrow behind the disk opener. A packer wheel, attached to the same frame member as the disk opener, typically follows the disk opener for closing the furrow so that the seed is completely enclosed with soil.

A problem occurs when the disk opener engages an object such as a rock or a hardened piece of soil. When the disk opener is pushed up by the object, the packer wheel is simultaneously lifted up since they are attached to the same frame member. When the packer wheel is lifted up, the furrow containing the seed remains open with the seed undesirably exposed.

Another problem occurs when the packer wheel eventually engages the object that the disk opener went over. When the packer wheel engages the object, the disk opener is simultaneously lifted up since they are attached to the same frame member. When the disk opener is lifted up, the furrow is not at a desirable depth with the seed sometimes being placed directly upon the ground surface. Hence there is a need for a disk opener and packer wheel system that will overcome the shortcomings of the prior art.

Examples of seeding devices include U.S. Pat. No. 4,116,140 to Anderson et al; U.S. Pat. No. 4,407,207 to Dreyer; U.S. Pat. No. 5,724,902 to Janelle et al; U.S. Pat. No. 3,901,169 to Ribouleau; U.S. Pat. No. 5,398,625 to Johnson et al; U.S. Pat. No. 4,422,392 to Dreyer et al; U.S. Pat. No. 4,721,048 to Fuss et al which are all illustrative of such prior art.

Anderson et al (U.S. Pat. No. 4,116,140) discloses a drill having a disk furrow opener and press wheels which determine the depth of penetration of the disks.

Dreyer (U.S. Pat. No. 4,407,207) discloses a press wheel depth control for grain drill furrow openers. Dreyer teaches a depth control for grain drills by utilizing a press wheel which can be adjusted to control the depth of each individual furrow opener to insure uniform depth of planting.

While these devices may be suitable for the particular purpose to which they address, they are not as suitable for maintaining a constant disk opener depth and for maintaining a constant packing of the soil by the packer wheel when planting upon uneven surfaces. Conventional seeders tend to not operate efficiently upon uneven ground surfaces leaving seed exposed either directly upon the ground surface or within the seed furrow.

In these respects, the disk opener and packer wheel system according to the present invention substantially departs from the conventional concepts and designs of the prior art, and in so doing provides an apparatus primarily developed for the purpose of maintaining a constant disk opener depth and for maintaining a constant packing of the soil by the packer wheel when planting upon uneven surfaces.

SUMMARY OF THE INVENTION

In view of the foregoing disadvantages inherent in the known types of seeding devices now present in the prior art, the present invention provides a new disk opener and packer wheel system construction wherein the same can be utilized for maintaining a constant disk opener depth and for maintaining a constant packing of the soil by the packer wheel when planting upon uneven surfaces.

The general purpose of the present invention, which will be described subsequently in greater detail, is to provide a new disk opener and packer wheel system that has many of the advantages of the seeding devices mentioned heretofore and many novel features that result in a new disk opener and packer wheel system which is not anticipated, rendered obvious, suggested, or even implied by any of the prior art seeding devices, either alone or in any combination thereof.

To attain this, the present invention generally comprises a frame having a bracket for attaching to the drill, a pair of support arms pivotally attached to the frame, a compression spring positioned between the support arm and the frame, a first member pivotally attached between the pair of support arms, a second member pivotally attached between the pair of support arms, a disk opener attached to the lower end of the first member, a packer wheel attached to the lower end of the second member, and an adjusting shaft adjustably positioned between the upper ends of the first member and the second member. In use, when the disk opener engages a hard object, such as a rock, the disk opener and the support arm are elevated while the packer wheel is forced downwardly to compensate for the elevated support arm. When the packer wheel engages a hard object, such as a rock, the packer wheel and the support arm are elevated while the disk opener is forced downwardly to compensate for the elevated support arm. The user may adjust the relative heights of the disk opener and the packer wheel by simply manipulating the adjusting shaft.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practices and carried out in various ways. Also, it is to be understood that the phraseology and terminology employed herein are for the purpose of the description and should not be regarded as limiting.

A primary object of the present invention is to provide a disk opener and packer wheel system that will overcome the shortcomings of the prior art devices.

Another object is to provide a disk opener and packer wheel system that maintains a uniform furrow depth for receiving seed.

An additional object is to provide a disk opener and packer wheel system that maintains a constant pressure upon the open furrow by the packer wheel to close the open furrow with the seed within.

A further object is to provide a disk opener and packer wheel system that operates upon uneven ground surfaces.

Another object is to provide a disk opener and packer wheel system that increases crop yields by increasing the percentage of seeds that properly germinate.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
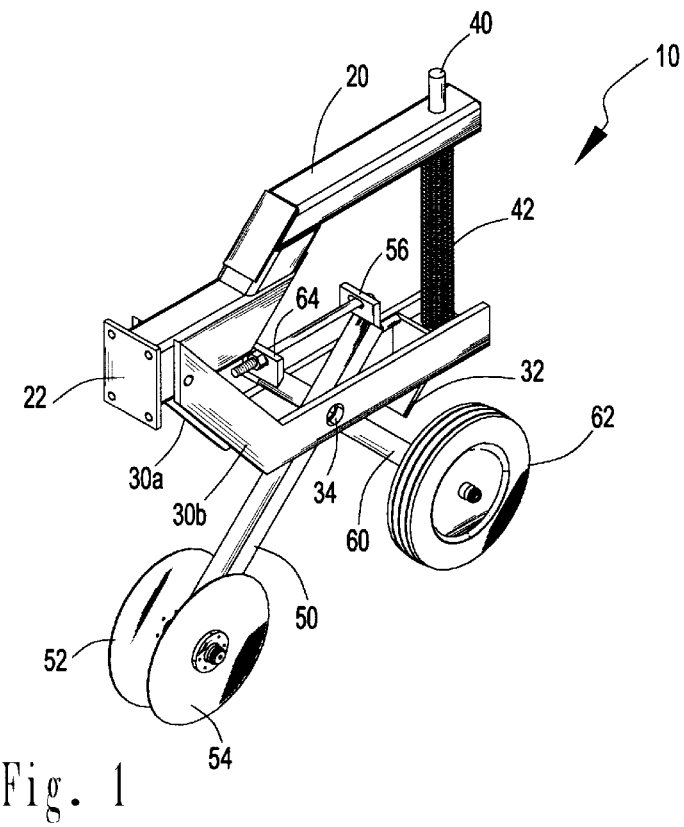
FIG. 1 is an upper perspective view of the present invention.

Turning now descriptively to the drawings, in which similar reference characters denote similar elements throughout the several view, FIGS. 1 through 4 illustrate a disk opener and packer wheel system 10, which comprises a frame 20 having a bracket 22 for attaching to the drill, a pair of support arms 30a–b pivotally attached to the frame 20, a compression spring 42 positioned between the support arms 30a–b and the frame 20, a first member 50 pivotally attached between the pair of support arms 30a–b, a second member 60 pivotally attached between the pair of support arms 30a–b, a disk opener 52, 54 attached to the lower end of the first member 50, a packer wheel 62 attached to the lower end of the second member 60, and an adjusting shaft 70 adjustably positioned between the upper ends of the first member 50 and the second member 60. In use, when the disk opener 52, 54 engages a hard object 14, such as a rock, the disk opener 52, 54 and the support arms 30a–b are elevated while the packer wheel 62 is forced downwardly to compensate for the elevated support arms 30a–b. When the packer wheel 62 engages a hard object 14, such as a rock, the packer wheel 62 and the support arms 30a–b are elevated while the disk opener 52, 54 is forced downwardly to compensate for the elevated support arms 30a–b. The user may adjust the relative heights of the disk opener 52, 54 and the packer wheel 62 by simply manipulating the adjusting shaft 70.

As best shown in FIG. 1, a bracket 22 is attached to the frame 20 for removably mounting the invention to an implement. The frame 20 is preferably of an elongated structure, however it can be appreciated that various other shapes and designs may be utilized.

Figure 2:
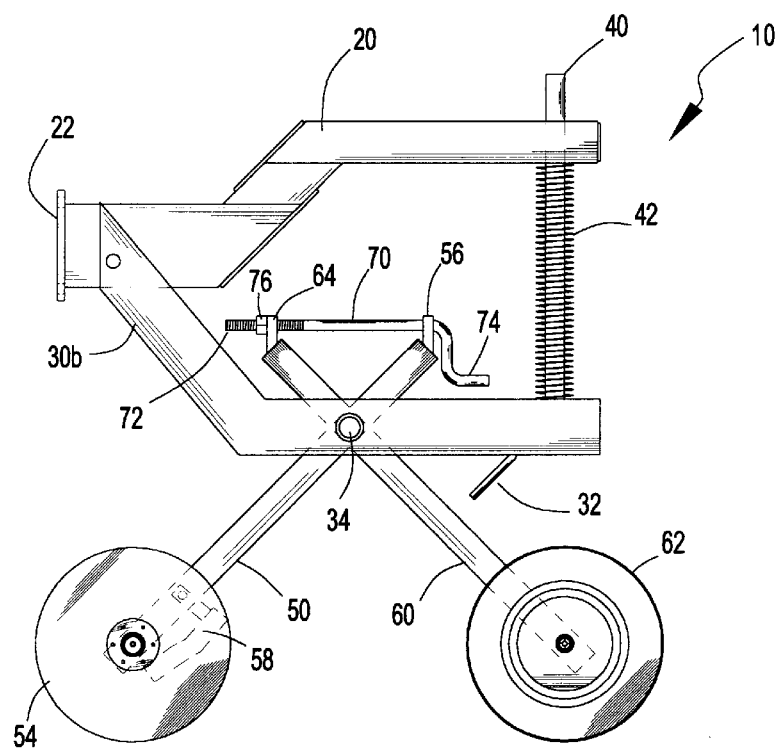
FIG. 2 is a side view of the present invention.
Figure 3:
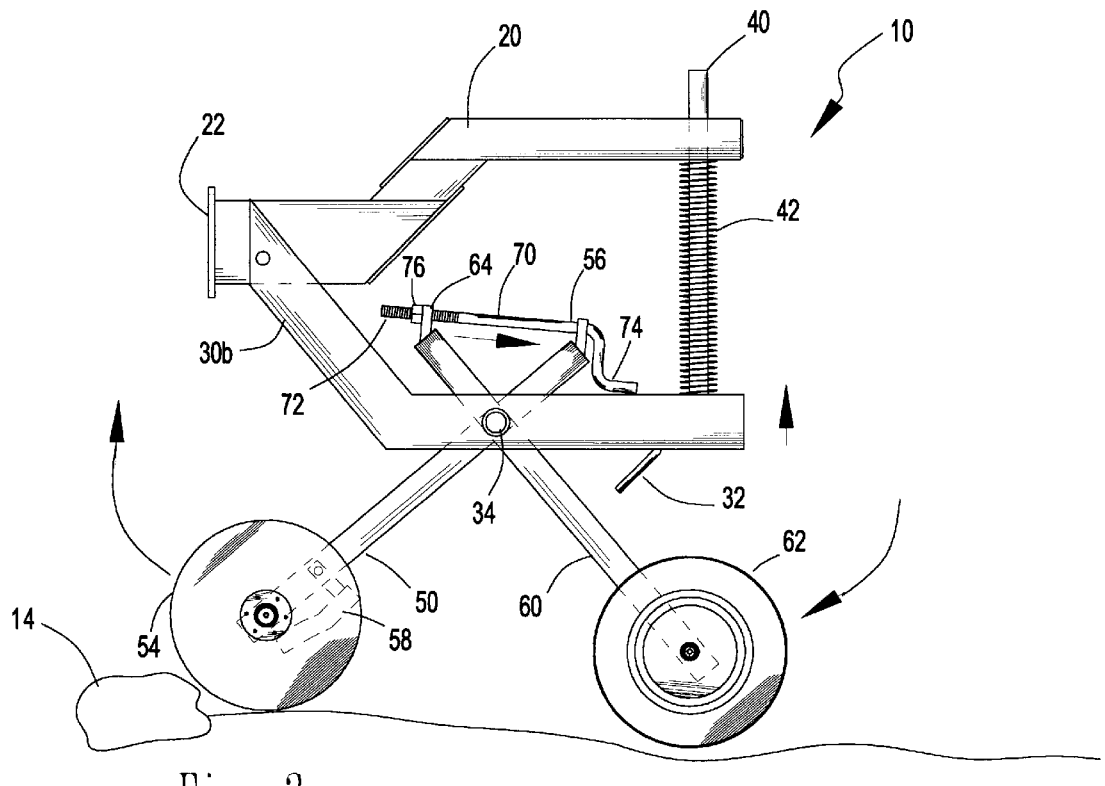
FIG. 3 is a side view of the present invention with the disk opener engaging an object.
Figure 4:
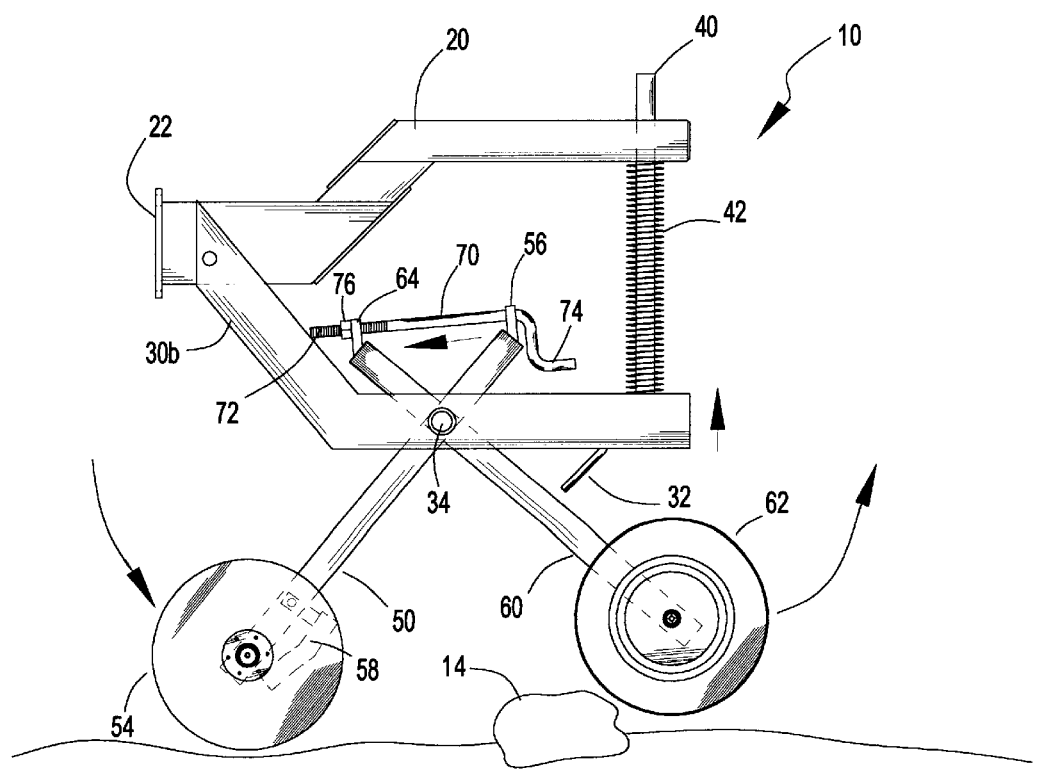
FIG. 4 is a side view of the present invention with the packer wheel engaging an object.

As best shown in FIGS. 2 through 3, a pair of support arms 30a–b are pivotally attached to opposing sides of the frame 20 preferably adjacent the bracket 22. The pair of support arms 30a–b are substantially parallel to one another and are connected to each other at their respective distal ends. It can be appreciated by one skilled in the art that various other designs of the support arms 30a–b may be utilized, such as a single support arm instead of having a pair of support arms 30a–b. As shown in FIGS. 2 through 4, a stop member 32 is attached to the support arms 30a–b to limit the movement of the second member 60 thereby maintaining at least some pressure upon the packer wheel 62 if the disk opener 52, 54 should encounter a ravine or hole. In normal operation of the invention, the second member 60 is normally in engagement with the stop member 32, however it can be appreciated by one skilled in the art that the second member 60 may be distally spaced from the stop member 32 for a period of time depending upon the ground surface.

As best shown in FIGS. 1 and 2 of the drawings, a shaft member 40 extends from the pair of support arms 30a–b upwardly toward and in slidably engagement with the distal end of the frame 20. A compression spring 42 surrounds the shaft member 40 and is in compression between the pair of support arms 30a–b and the frame 20. The compression spring 42 applies a downwardly force upon the support arms 30a–b to insure the disk opener 52, 54 and the packer wheel 62 are in engagement with the ground surface 12. It can be appreciated by one skilled in the art that various other spring means may be utilized to apply downward pressure upon the support arms 30a–b.

As shown in FIGS. 2 through 3 of the drawings, a first member 50 is pivotally attached between the pair of support arms 30a–b by an axle 34. The lower end of the first member 50 rotatably supports a disk opener 52, 54 comprised of a first disk 52 and a second disk 54. The disk opener 52, 54 penetrates the ground surface 12 at a specified depth thereby creating a furrow for receiving seeds. As further shown in FIGS. 2 through 4 of the drawings, the distal end of a seed tube 58 is positioned within the disk opener 52, 54 to allow seeds to be positioned within the furrow created by the disk opener 52, 54. The seed tube 58 is connected to a conventional seed emitting means such as an air seeder.

As shown in FIGS. 2 through 4 of the drawings, a second member 60 is pivotally attached between the pair of support arms 30a–b by the axle 34 adjacent the first member 50. The lower end of the second member 60 rotatably supports a packer wheel 62 at a specified pressure for covering the seeds within the furrow.

As shown in FIGS. 2 through 4, there is an adjusting means that allows the user to adjust the depth of the disk opener 52, 54 and the packer wheel 62. The adjusting means comprises a first collar member 56 attached to the distal end of the first member 50, a second collar member 64 attached to the distal end of the second member 60 and an adjusting shaft 70 in movable engagement with the first collar member 56 and the second collar member 64. As shown in FIGS. 2 through 4, the adjusting shaft 70 has a threaded end 72 and a handle 74. The threaded end 72 is in threadable engagement with the second collar member 64 while the opposite end of the adjusting shaft 70 is in rotatable engagement with the first collar member 56. Preferably, a locking fastener 76 is threadably attached to the threaded end 72 of the adjusting shaft 70 to prevent the adjusting shaft 70 from rotating when in the desired position.

In use, the user first adjusts the adjusting shaft 70 to have the appropriate spring pressure applied to the disk opener 52, 54 and the packer wheel 62. The user first loosens the locking fastener 76 and then manipulates the handle 74 attached to the adjusting shaft 70 to achieve the desired position. The user then tightens the locking fastener 76 against the second collar member 64 to retain the adjusting shaft 70 in the desired position. When in use, the disk opener 52, 54 penetrates the ground surface 12 at the desired depth creating a furrow. Seed is positioned within the furrow by the seed tube 58 following the disk opener 52, 54. The seed is then covered with soil by the packer wheel 62 that follows the disk opener 52, 54. When the disk opener 52, 54 engages a hard object 14, such as a rock, the disk opener 52, 54 is pushed upwardly which forces the support arms 30a–b upwardly also thereby compressing the compression spring 42. While the packer wheel 62 is pulled upwardly along with the support arms 30a–b, a balancing effect is achieved by the rotational force from the first member 50 supporting the disk opener 52, 54 forcing the second member 60 and the packer downwardly against the ground surface 12 thereby substantially compensating for the vertical lift of the support arms 30a–b. This ensures that the packer wheel 62 is still packing soil around the seeds within the furrow created before the object 14. The same applies when the packer wheel 62 engages the object 14. As the packer wheel 62 and the support arms 30a–b are pushed upwardly, the first member 50 is rotated thereby forcing the disk opener 52, 54 downwardly to compensate for the vertical lift of the support arms 30a–b. This maintains a substantially constant seed depth during planting.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A disk opener and packer wheel system, comprising:
   at least one support arm;
   a first member having a first lower end and a first upper end, wherein said first member is rotatably attached to said at least one support arm between said first lower end and said first upper end;
   a disk opener means rotatably attached to said first lower end for creating a furrow;
   a second member having a second lower end and a second upper end, wherein said second member is rotatably attached to said at least one support arm between said second lower end and said second upper end;
   a packer wheel means rotatably attached to said second lower end for enclosing said furrow during planting; and
   a connecting means connected between said first upper end and said second upper end.

2. The disk opener and packer wheel system of claim 1, including a stop member attached to said at least one support arm, wherein said stop member limits the rotation of said first member and said second member.

3. The disk opener and packer wheel system of claim 2, wherein said connecting means is adjustable for allowing adjustment of the relative position of said disk opener means and said packer wheel means.

4. The disk opener and packer wheel system of claim 3, wherein said connecting means comprises an adjusting shaft having a threaded end and handle, wherein said threaded end is in threadable engagement with said second upper end and said adjusting shaft is in rotatably engagement with said first upper end.

5. The disk opener and packer wheel system of claim 4, wherein said connecting means further includes a locking fastener in threadable engagement with said threaded end.

6. The disk opener and packer wheel system of claim 5, wherein said first member and said second member is rotatably attached to said at least one support arm by a common axle.

7. The disk opener and packer wheel system of claim 6, wherein said at least one support arm comprises a pair of opposing support arms surrounding a portion of said first member and said second member.

8. A disk opener and packer wheel system, comprising:
   a frame having a bracket means for attachment to an implement;
   at least one support arm pivotally attached to said frame;
   a spring means connected between said frame and said at least one support arm for applying downward pressure upon said at least one support arm;
   a first member having a first lower end and a first upper end, wherein said first member is rotatably attached to said at least one support arm between said first lower end and said first upper end;
   a disk opener means rotatably attached to said first lower end for creating a furrow;
   a second member having a second lower end and a second upper end, wherein said second member is rotatably attached to said at least one support arm between said second lower end and said second upper end;
   a packer wheel means rotatably attached to said second lower end for enclosing said furrow during planting; and
   a connecting means connected between said first upper end and said second upper end.

9. The disk opener and packer wheel system of claim 8, including a stop member attached to said at least one support arm, wherein said stop member limits the rotation of said first member and said second member.

10. The disk opener and packer wheel system of claim 9, wherein said connecting means is adjustable for allowing adjustment of the relative position of said disk opener means and said packer wheel means.

11. The disk opener and packer wheel system of claim 10, wherein said connecting means comprises an adjusting shaft having a threaded end and handle, wherein said threaded end is in threadable engagement with said second upper end and said adjusting shaft is in rotatably engagement with said first upper end.

12. The disk opener and packer wheel system of claim 11, wherein said connecting means further includes a locking fastener in threadable engagement with said threaded end.

13. The disk opener and packer wheel system of claim 12, wherein said first member and said second member is rotatably attached to said at least one support arm by a common axle.

14. The disk opener and packer wheel system of claim 13, wherein said at least one support arm comprises a pair of opposing support arms surrounding a portion of said first member and said second member.

15. The disk opener and packer wheel system of claim 14, wherein said spring means comprises:

a shaft member connected between said frame and said pair of opposing support arms; and a compression spring surrounding said shaft member and in compression between said frame and said pair of opposing support arms.

* * * * *